(12) United States Patent
Reinisch et al.

(10) Patent No.: US 7,149,483 B1
(45) Date of Patent: Dec. 12, 2006

(54) AMPLIFYING DIVERSITY SIGNALS USING POWER AMPLIFIERS

(75) Inventors: William Reinisch, New York, NY (US); Ming Yang, Princeton Junction, NJ (US); Haim Harel, New York, NY (US)

(73) Assignee: Magnolia Broadband Inc., Bedminster, NJ (US)

( * ) Notice: Subject to any disclaimer, the term of this patent is extended or adjusted under 35 U.S.C. 154(b) by 455 days.

(21) Appl. No.: 10/695,226

(22) Filed: Oct. 28, 2003

(51) Int. Cl.
*H03C 7/02* (2006.01)
*H04B 1/02* (2006.01)
*H04B 7/00* (2006.01)

(52) U.S. Cl. .................... 455/101; 455/103; 455/91
(58) Field of Classification Search ............... 455/101, 455/103, 107, 91, 108, 113, 115.1, 115.3, 455/125–126, 127.5, 70, 522
See application file for complete search history.

(56) References Cited

U.S. PATENT DOCUMENTS

| | | | |
|---|---|---|---|
| 3,612,771 A | 10/1971 | Caniquit .................... 179/15 |
| 4,099,228 A | 7/1978 | Cohn ......................... 363/159 |
| 4,160,975 A | 7/1979 | Steudel .................... 342/89 |
| 4,227,156 A | 10/1980 | Mattfeld .................... 330/126 |
| 4,558,289 A | 12/1985 | Muterspaugh ............. 330/278 |
| 4,682,176 A | 7/1987 | Jones ........................ 342/175 |
| 4,763,082 A | 8/1988 | Reuschle ................... 330/295 |
| 4,791,421 A | 12/1988 | Morse et al. ............... 342/368 |
| 4,823,094 A | 4/1989 | Reiffin ........................ 330/263 |
| 4,855,614 A | 8/1989 | Maitre ....................... 327/412 |
| 4,951,060 A | 8/1990 | Cohn ........................ 342/175 |
| 5,032,801 A | 7/1991 | Woo et al. ................. 333/81 R |
| 5,060,294 A | 10/1991 | Schwent et al. ............. 455/93 |
| 5,204,645 A | 4/1993 | Hohmann .................... 334/1 |
| 5,291,516 A | 3/1994 | Dixon et al. ................ 375/131 |
| 5,361,403 A | 11/1994 | Dent ........................... 455/74 |
| 5,402,138 A | 3/1995 | Hulett et al. ................ 343/840 |
| 5,406,615 A | 4/1995 | Miller, II et al. ......... 455/552.1 |
| 5,438,684 A | 8/1995 | Schwent et al. .......... 455/552.1 |
| 5,448,255 A | 9/1995 | Hulett et al. ................ 343/840 |
| 5,457,734 A | 10/1995 | Eryaman et al. .......... 455/553.1 |
| 5,584,057 A * | 12/1996 | Dent ........................... 455/101 |
| 5,960,330 A * | 9/1999 | Azuma ........................ 455/70 |
| 6,111,459 A | 8/2000 | Nishijima et al. ............ 330/51 |
| 6,242,986 B1 | 6/2001 | Adar .......................... 330/302 |
| 6,584,161 B1 * | 6/2003 | Hottinen et al. ............ 375/299 |
| 6,658,269 B1 * | 12/2003 | Golemon et al. ........... 370/315 |
| 6,750,719 B1 * | 6/2004 | Toyota et al. ............... 330/285 |
| 6,754,286 B1 * | 6/2004 | Hottinen et al. ............ 375/299 |
| 6,865,377 B1 * | 3/2005 | Lindskog et al. ........... 455/101 |
| 2003/0002594 A1 * | 1/2003 | Harel et al. ................. 375/299 |
| 2004/0235433 A1 * | 11/2004 | Hugl et al. ................. 455/101 |

OTHER PUBLICATIONS

"*CDMA PAs for Cellular, PCS & 3G Handsets*," Anadigics CDMA Power Amplifier Products, ANADIGICS Measurably superior thinking, 8 pages, Oct. 2003.

(Continued)

*Primary Examiner*—Sonny Trinh
(74) *Attorney, Agent, or Firm*—Pearl Cohen Zedek Latzer, LLP

(57) ABSTRACT

A method for amplifying diversity transmit signals includes receiving a transmit signal at a vector modulator, where the vector modulator processes the transmit signal to yield diversity transmit signals, amplifying each of the diversity transmit signals according to a gain using at least one power amplifier, and transmitting the amplified diversity transmit signals at a plurality of antennas.

30 Claims, 3 Drawing Sheets

OTHER PUBLICATIONS

"*A Dynamic Current Control Scheme for RF Power Amplifiers*", RF Micro Devices, Inc., TA0035, Technical Notes and Articles, pp. 13-177-13-180, Copyright 1997-2000.

"*Wireless Design Technology Can Double Battery Life*", Wireless Systems Design, http://www.elecdesign.com/Globals/PlanetEE/Content/194.html, 3 pages, Oct. 1999.

* cited by examiner

US 7,149,483 B1

AMPLIFYING DIVERSITY SIGNALS USING POWER AMPLIFIERS

TECHNICAL FIELD OF THE INVENTION

This invention relates generally to the field of wireless communications and more specifically to amplifying diversity signals using power amplifiers.

BACKGROUND OF THE INVENTION

Diversity antenna systems may be used to transmit signals from a mobile device to a base station. The power level of the transmitted signals generally affects the performance of the system. For example, weak signal power may increase degradation of the transmitted signal, which may result in poor reception of the transmitted signal at the base station. Known techniques for increasing the power of diversity signals may include increasing the gain of the antennas used at the mobile device. Increasing the gain of the mobile antennas, however, may result in higher cost, more power consumption, and more required space, which may not be allowed by industry standards. Consequently, known techniques for increasing the power of diversity signals are unsatisfactory in certain situations.

SUMMARY OF THE INVENTION

In accordance with the present invention, disadvantages and problems associated with previous techniques for amplifying diversity transmit signals may be reduced or eliminated.

One aspect of the invention is a method for amplifying diversity transmit signals that includes receiving a transmit signal at a vector modulator, where the vector modulator processes the transmit signal to yield diversity transmit signals, amplifying each of the diversity transmit signals according to a gain using at least one power amplifier, and transmitting the amplified diversity transmit signals at a plurality of antennas.

According to another embodiment, diversity transmit signals may be amplified by receiving transmit signals and a control signal, where the control signal includes a gain path selection; selecting at least one gain path from according to the gain path selection of the control signal, where each gain path is associated with at least one gain; amplifying the transmit signals according to the at least one gain; and transmitting the amplified transmit signals using a plurality of antennas.

Certain embodiments of the invention may provide one or more technical advantages. A technical advantage of one embodiment may be that using a power amplifier for amplifying a transmit signal at each channel of a diversity antenna system may result in higher gains of the transmitted signal, which may improve signal reception at a base station. Another technical advantage of an embodiment may be that the power amplifiers of the diversity antenna system may operate at half-power compared to amplifiers used with a non-diversity antenna system, which may result in maintaining low power consumption while increasing the range of operation of the mobile device. Yet another technical advantage may be that operating at half-power may yield a lower total output power, lower cost, and reduce the total average current consumption. Yet another technical advantage of an embodiment may be that including a vector modulator and the power amplifiers at a common substrate may reduce size and cost of the mobile device.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
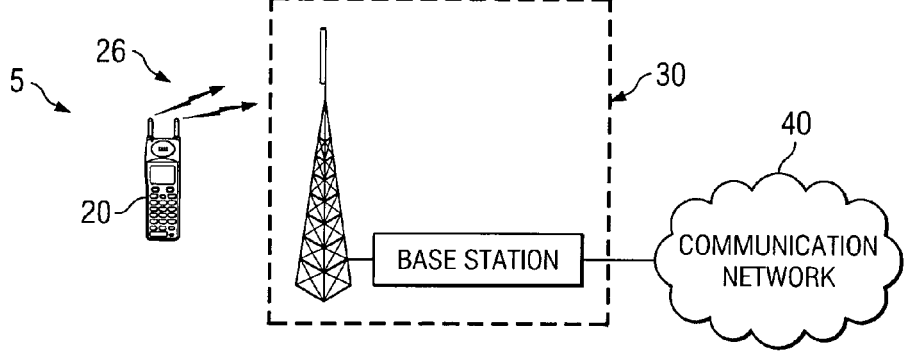
FIG. 1 is a block diagram of an embodiment of a telecommunication system incorporating a diversity antenna system that may be used in accordance with the present invention.

FIG. 1 is a block diagram of an embodiment of a telecommunication system 5 incorporating a diversity antenna system at a mobile device that may be used in accordance with the present invention. In operation, a mobile device 20 transmits diversity signals 26 that a base station 30 may receive in order to forward the information encoded in diversity signals 26 to communication network 40. Mobile device 20 may also receive signals from base station 30.

Mobile device 20 may be equipped with a diversity antenna system that generates diversity signals 26. A diversity antenna system is more particularly described with reference to FIG. 2. Mobile device 20 may comprise, for example, a personal digital assistant, a cellular telephone, a mobile handset, or any other device suitable for communicating with base station 30. Mobile device 20 may utilize, for example, Global System for Mobile communications (GSM) technology, Code Division Multiple Access (CDMA) technology, or any other suitable mobile communication technology. Diversity signals 26 from mobile device 20 may comprise any suitable signal modulated by a carrier such as data packets communicating information such as data, voice, video, multimedia, any other suitable type of signal, or any combination of the preceding.

Base station 30 provides mobile device 20 with access to telecommunication system 5. Base station 30 communicates signals to and from mobile device 20 and manages the local operation of base station controllers. The wireless link between mobile device 20 and base station 30 is typically a radio frequency link that may be cellular in network organization. Base station 30 may include transmission equipment suitable for receiving the diversity signals 26 from mobile device 20. According to one embodiment, base station 30 may include one or more antennas that receive diversity signals 26 and a receiver that decodes the information encoded in diversity signals 26.

Communication network 40 may comprise a global computer network such as the Internet, extranet, corporate Virtual Private Network (VPN), a local area network (LAN), a metropolitan area network (MAN), a wide area networks (WAN), a telecommunications network such as SONET/SDH based network, or any other suitable communication or telecommunications network. According to one embodiment, communication network 40 may comprise a private network that links base stations 30 of telecommunication system 5.

Figure 2:
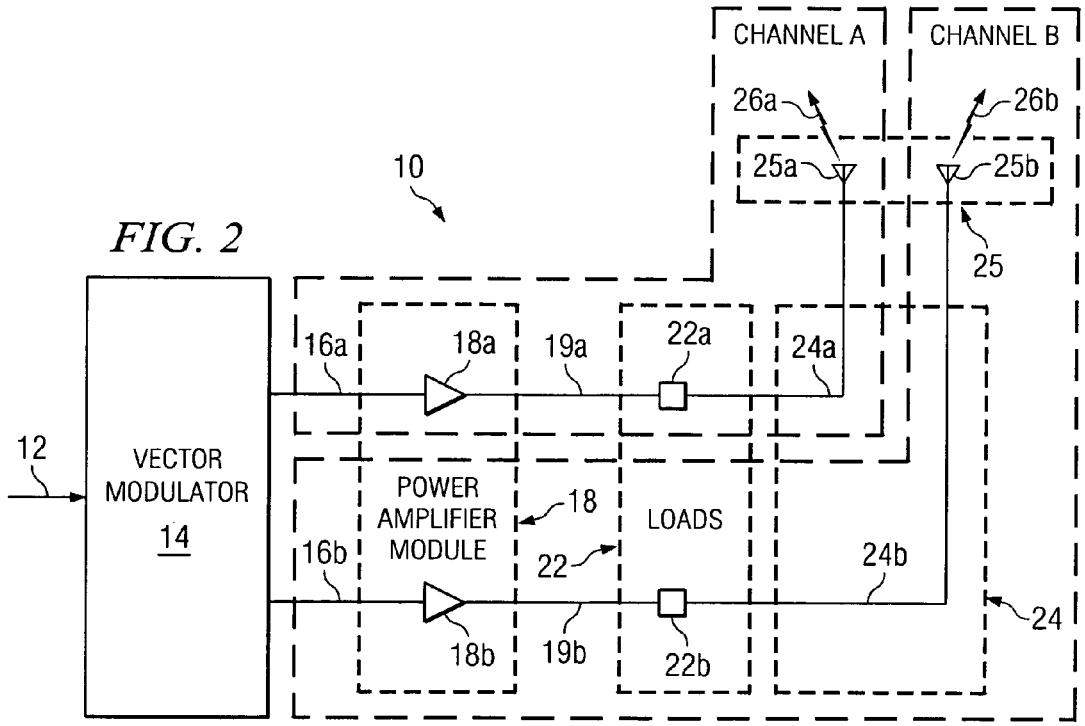
FIG. 2 is a block diagram of an embodiment of a diversity antenna system that may be used with the telecommunication system of FIG. 1.

One embodiment of a diversity antenna system that may be used with the telecommunication system of FIG. 1 is described with reference to FIG. 2. Embodiments of power amplifier modules that may be used with the diversity antenna system of FIG. 2 are described with reference to FIGS. 3A and 3B. One embodiment of a power amplifier module having amplification stages that may be used in accordance with the present invention is described with reference to FIG. 4. A flowchart illustrating a method for amplifying diversity signals in accordance with the present invention is described with reference to FIG. 5. "Each" as used in this document refers to each member of a set or each member of a subset of a set.

FIG. 2 illustrates an embodiment of a diversity antenna system 10 that may be used in a mobile device 20 within telecommunication system 5 of FIG. 1. Diversity antenna system 10 receives and adjusts an input transmit signal 12 to yield two or more adjusted signals 16, amplifies the two or more adjusted signals 16 to yield two or more amplified signals 19, and transmits amplified signals 19 through a pair of antennas 25 to generate diversity signals 26. According to the illustrated embodiment, diversity antenna system 10 includes a vector modulator 14, a power amplifier module 18, loads 22, and antennas 25 as shown in FIG. 2.

Vector modulator 14 receives an input transmit signal 12 and outputs two or more adjusted signals 16. According to one embodiment, vector modulator 14 outputs adjusted signals 16 by adjusting the phase rotation and/or amplitude of input transmit signal 12. For example, vector modulator 14 may split input transmit signal 12 to yield two or more split signals and adjust each split signal by rotating the phase, adjusting the amplitude, or a combination of the preceding. According to the illustrated embodiment, vector modulator 14 outputs two or more adjusted signals 16 such that for each adjusted signal 16 a corresponding channel path is formed. For example, adjusted signal 16*a* corresponds to channel path A and adjusted signal 16*b* corresponds to channel path B. Vector modulator 14 may be implemented in a substrate such as a Silicon (Si) substrate, Silicon Germanium (SiGe) substrate, or other suitable substrate, or die mounted in any suitable single substrate.

Power amplifier module 18 receives and amplifies the adjusted signals 16 to yield amplified signals 19. Power amplifier module 18 includes a power amplifier 18*a* and 18*b* at each channel path of the diversity antenna system 10. According to the illustrated embodiment, power amplifier module 18 comprises two power amplifiers 18*a* and 18*b*, each coupled to a channel path of diversity antenna system 10 to amplify each adjusted signal 16 at the corresponding channel path. For example, power amplifier 18*a* is coupled to vector modulator 14 at channel path A to amplify adjusted signal 16*a*, while power amplifier 18*b* is coupled to vector modulator 14 at channel path B to amplify adjusted signal 16*b*. Power amplifier module 18 may include any suitable number of power amplifiers coupled at any suitable number of channel paths of diversity antenna system 10 without departing from the scope of the invention. According to one embodiment, power amplifier module 18 may be implemented in any common substrate with vector modulator 14. Power amplifier module 18 may be implemented in a substrate such as a Gallium Arsenide (GaAs) substrate, a Silicon Germanium (SiGe) substrate, or other suitable substrate, or die mounted on any suitable single substrate. If the vector modulator and power amplifier are built on the same substrate material, it may be possible to integrate power amplifier 18 in a single die.

Loads 22 or matching circuits may be coupled to the output of power amplifier module 18 for tuning each channel path of diversity antenna system 10. According to the illustrated embodiment, each channel path of diversity antenna system 10 includes a load 22. For example, channel path A includes a load 22*a* and channel path B includes a load 22*b*. Each amplified signal 19 passes through a corresponding load 22 to yield transmit output signals 24. For example, amplified signal 19*a* passes through load 22*a* to yield transmit output signal 24*a*, while amplified signal 19*b* passes through load 22*b* to yield transmit output signal 24*b*. Loads 22 may comprise passive impedance elements that generate transmit output signals 24 that correspond to the amplified signals 19. Loads 22 may include any other suitable impedance elements without departing from the scope of the invention. According to one embodiment, loads 22 may be implemented in a common substrate and/or package with power amplifier module 18.

Each load 22 has a corresponding impedance value that may be used to design a channel path that is properly tuned. For example, a load 22*a* with an impedance of 50 Ohms may be used at a channel path that requires a 50 Ohm impedance match. According to another embodiment, load 22*a* may comprise a different impedance value than load 22*b*. Using different impedance at loads 22 may be useful when diversity antenna system 10 requires different impedance at each channel path. For example, diversity antenna system 10 may include antennas 25 having each a different impedance load specification, which may require that loads 22 each has a different impedance.

Antennas 25 transmit output transmit signals 24. According to the illustrated embodiment, each channel path of diversity antenna system 10 includes an antenna 25. For example, channel path A includes antenna 25*a* to transmit output transmit signal 24*a* and generate diversity signal 26*a*, and channel path B includes antenna 25*b* to transmit output transmit signal 24*b* and generate diversity signal 26*b*. According to one embodiment, each antenna 25 may be of a different type. For example, antenna 25*a* may be an internal printed antenna, while antenna 25*b* may be an external stubby antenna. Any other suitable type of antenna may be used as antennas 25, for example, wipe antennas, patch antennas, and magnetic antennas may be used.

Modifications, additions, or omissions may be made to diversity antenna system 10 without departing from the scope of the invention. For example, loads 22 may be omitted if tuning or matching of antennas 25 is not necessary. As another example, any suitable number of power amplifiers may be added to diversity antenna system 10. As yet another example, any suitable number of channel paths may be used at diversity antenna system 10 to accommodate any suitable number of antennas 25. As yet another example, filters or duplexers may be added to diversity antenna system 10. Additionally, functions may be performed using any suitable logic comprising software, hardware, other logic, or any suitable combination of the preceding.

Figure 3A:
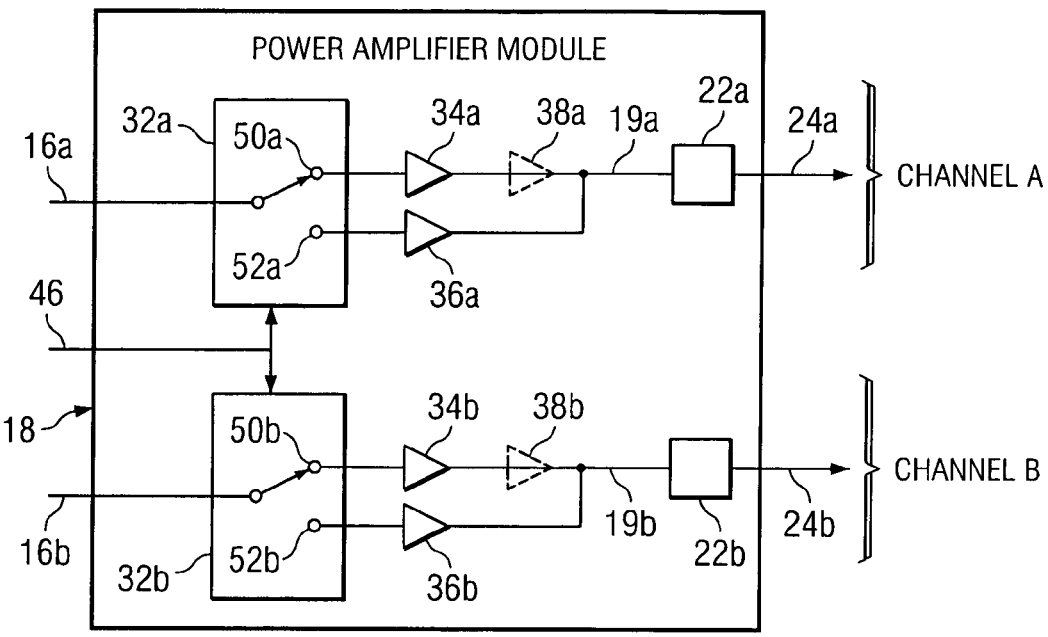
FIGS. 3A and 3B are diagrams of embodiments of power amplifier modules that may be used with the diversity antenna system of FIG. 2.
Figure 3B:
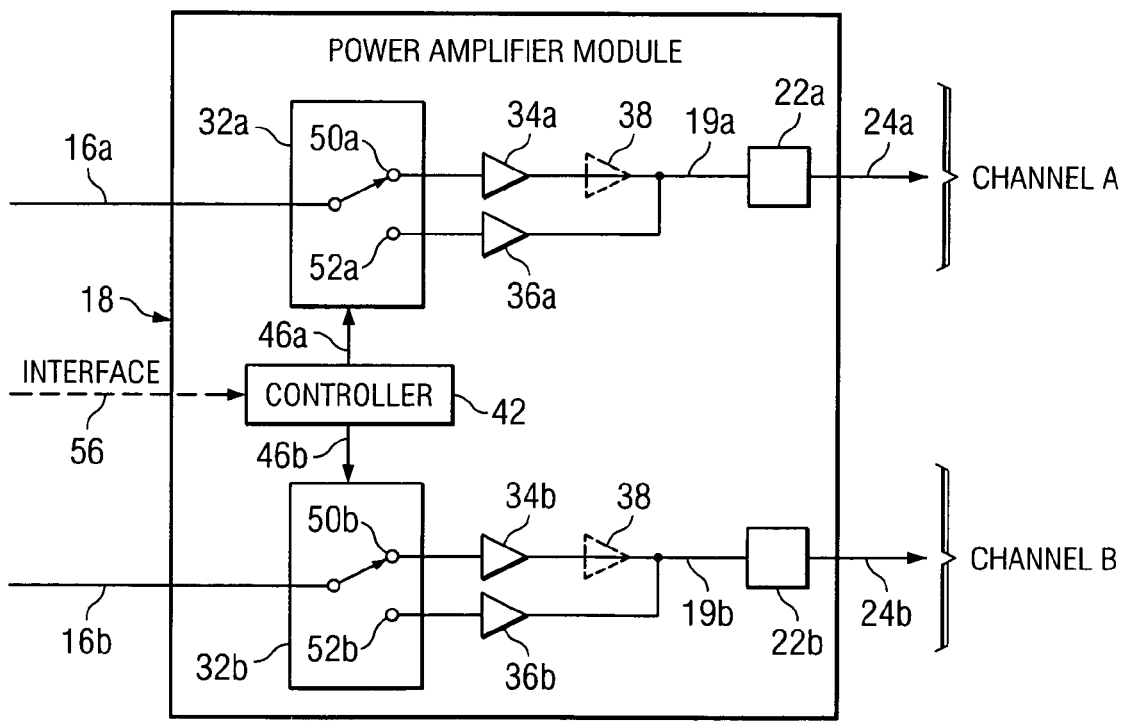

FIGS. 3A and 3B are diagrams of embodiments of power amplifier modules 18 that may be used with diversity antenna system 10 of FIG. 2. FIG. 3A illustrates a power amplifier module 18 that receives an external control signal 46, while FIG. 3B illustrates a power amplifier module 18 having an internal controller 42 that generates an internal control signal 46.

FIG. 3A is a diagram of one embodiment of a power amplifier module 18, which includes amplifiers 34, 38, and 36, switches 32, and loads 22, that are controlled by an external control signal 46. For each channel path of diversity antenna system 10, power amplifier module 18 includes a switch 32 for selecting a gain path. For example, power amplifier module 18 includes a switch 32a associated with channel path A, where switch 32a can select between two gain paths according to a first and second switch selection 50a and 52a. Similarly, switch 32b is associated with a channel path B, where switch 32b can select between two gain paths according to a first and second switch selection 50b and 52b. By providing gain path selection, diversity antenna system 10 may be used with different switching mode systems such as CDMA, low band CDMA, and GSM, which may more effectively combine the usefulness of dual mode systems and diversity antenna systems.

Switches 32 may be controlled by a control signal 46 in order for adjusted signals 16 to be forwarded to a selected gain path. Switches 32 may each be controlled independently for channel path A and/or channel path B. According to the illustrated embodiment, control signal 46 is an external control signal that may received from an external controller (not shown). For example, control signal 46 may be produced by a baseband processor and received at each switch 32 for selecting the appropriate gain path. Any other suitable device, processor, or logic may generate control signal 46 without departing from the scope of the invention.

According to one embodiment, each switch 32 selects between gain paths, which may include a high gain path associated with a high gain value and a low gain path associated with a low gain value less than the high gain value. For example, first switch position 50a selects a high gain path that has a high gain path amplifier 34a and a high gain stage amplifier 38a that yield a high gain value and second switch position 52a selects a low gain path that has a low gain path amplifier 36a that yields a low gain value. Similarly, switch 32b includes a first switch position 50b and second switch position 52b for selecting a high gain path or a low gain path, respectively. The high gain path includes a first high gain path amplifier 34b and high gain stage amplifier 38b, and the low gain path includes low gain path amplifier 36b. According to one embodiment, the high gain path and the low gain path of channel path A may be substantially similar to the high gain path and low gain path of channel path B. According to another embodiment, the high gain path and low gain path of channel path A may be different from the high gain path and low gain path of channel path B.

According to one example, the high gain path may yield a gain in the range of approximately 23 dB and 31 dB, while the low gain path may yield a gain in the range of approximately 5 dB and 15 dB. According to the illustrated embodiment, high gain path amplifiers 34a and 34b and high gain stage amplifiers 38a and 38b may be selected so that the overall gain of the high gain path is substantially close to 25 dB, and low gain path amplifiers 36a and 36b may be selected so that the overall gain of the low gain path is substantially close to 12 dB. Any other suitable combination of high gain and low gain at the high gain path and low gain paths may be selected. Additionally, each path may include more or fewer amplifiers. For example, each low gain path may include any suitable number of stage amplifiers in addition to low gain path amplifiers 36. As another example, each high gain path may include more or fewer amplifiers at high gain stage amplifiers 38a and 38b.

Power amplifier module 18 may include loads 22 that receive the amplified signals 19a and 19b as was described with reference to FIG. 2. According to the illustrated embodiment, amplified signal 19 may be generated according to the selected gain path and passed to a corresponding load 22. In this embodiment, signal 19a passes through load 22a to yield output transmit signal 24a, while signal 19b passes through load 22b to yield output transmit signal 24b. Power amplifier module 18 may be include any suitable number of loads 22 at each channel path without departing from the scope of the invention.

FIG. 3B is a diagram of another embodiment of a power amplifier module 18, which includes amplifiers 34, 38, and 36, switches 32, and loads 22, that are controlled by an internal controller 42. Internal control signals 46 are generated by internal controller 42 that determines the gain path to which to forward adjusted signals 16. Internal controller 42 may also receive a control signal or control code from a baseband processor.

Controller 42 may provide bias point selection for each of the power amplifier modules 18. According to one embodiment, control signals 46 generated by controller 42 may comprise a bias current that may be used to dynamically provide a bias point current to the amplifiers of power amplifier module 18. Controller 42 may also select the gain stage for each of the channel paths. Controller 42 may perform other suitable functions without departing from the scope of the invention. Controller 42 may include a device, processor, or other suitable logic for determining the appropriate gain path for adjusted signals 16. According to the illustrated embodiment, controller 42 is located at a common substrate with the components of power amplifier module 18. The common substrate may include a Silicon Germanium (SiGe) substrate, a Silicon (Si) substrate, or any other suitable substrate. Control signal 46a controls switch 32a from controller 42 and control signal 46b controls switch 32b from controller 42.

Modifications, additions, or omissions may be made to power amplifier module 18 without departing from the scope of the invention. For example, loads 22 may be omitted. As another example, additional controllers 42 and/or other interface 56 may be included to perform similar or other functions that aide power amplifier module 18 to amplify adjusted signals 16. As yet another example, any suitable number of gain paths may be included at each channel path.

Figure 4:
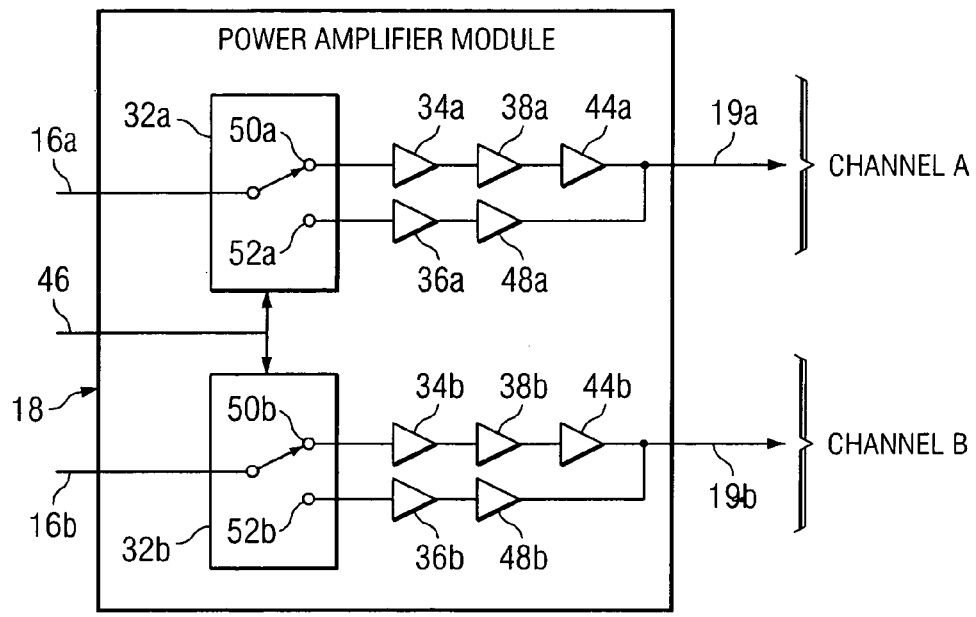
FIG. 4 is a diagram of an embodiment of a power amplifier module having amplification stages that may be used in accordance with the present invention.

FIG. 4 is a diagram of an embodiment of a power amplifier module 18 having amplification stages that may be used in accordance with the present invention. As was described with reference to FIGS. 3A and 3B, power amplifier module 18 may be equipped with two or more gain paths each capable of amplifying adjusted signals 16 to a predetermined gain. According to the illustrated embodiment, power module 18 is shown with three amplification stages at each high gain path and two amplification stages at each low gain path. Each high gain path may have more or fewer stages and may have different gain stages from each other. For example, the high gain stage of channel path A may have more gain stages than the high gain stage of channel B.

The high gain paths include high gain path amplifiers 34a and 34b, high gain stage amplifiers 38a and 38b, and high gain output amplifiers 44a and 44b. According to the illustrated embodiment, high gain path amplifiers 34a and 34b are substantially similar and are designed as an input stage with very high linearity and to yield a lower gain than the overall expected gain of the high gain path such as, for example, a gain of 5 dB. The high gain stage amplifiers 38a and 38b are substantially similar and comprise transition amplifiers selected to complement the high gain path amplifiers 34a and 34b. For example, high gain stage amplifiers 38a and 38b may yield a 5 dB gain. The high gain output amplifiers 44a and 44b are substantially similar and comprise output stage amplifiers designed to satisfy the total output gain and to substantially match a circuit output impedance. For example, high gain output amplifiers 44a and 44b may yield a 15 dB gain with high power added efficiency. Any other suitable gains may be used at each stage of the high gain stage without departing from the scope of the invention.

Although one amplifier per stage has been defined, each stage may include more amplifiers without departing from the scope of the invention. For example, high gain stage amplifiers 38a and 38b may comprise each more than one amplifier suitable for performing the transition between the input stage and the output stage of the high gain path. Additionally, more or fewer stages may be used, for example, such that high gain stage amplifiers 38a and 38b may be eliminated. According to the illustrated embodiment, each high gain path may achieve a total gain of 25 dB using the three stages shown.

The low gain paths include low gain path amplifiers 36a and 36b and low gain output amplifiers 48a and 48b. Similarly to the characteristics of high gain path amplifiers 34a and 34b, low gain path amplifiers 36a and 36b may be substantially similar and are designed as an input stage to provide high circuit linearity and to yield a lower gain than the overall expected gain of the low gain path such as, for example, a gain of 2 dB. Low gain output amplifiers 48a and 48b are substantially similar and comprise output stage amplifiers designed to satisfy the total output gain and to substantially match the circuit output impedance with high efficiency. For example, low gain output amplifiers 48a and 48b may yield a gain of 10 dB. According to the illustrated embodiment, each low gain path may achieve a total gain of 12 dB using the two stages shown. Each low gain path may include more or fewer amplifiers depending on the gain desired and the circuit impedance required.

Modifications, additions, or omissions may be made to power amplifier module 18 without departing from the scope of the invention. For example, although switches 32a and 32b are shown as being controlled by an external control signal 46, controller 42 may be used for generating an internal control signal 46 as was described with reference to FIG. 3B. As another example, although the output stage amplifiers 44a, 44b, 48a and 48b have been described as designed to substantially match the circuit output impedance, output stage amplifiers 44a, 44b, 48a and 48b may be designed with any other suitable purpose. Loads 22 and/or different matching networks may be coupled to power amplifier module 18 to perform impedance matching.

Figure 5:
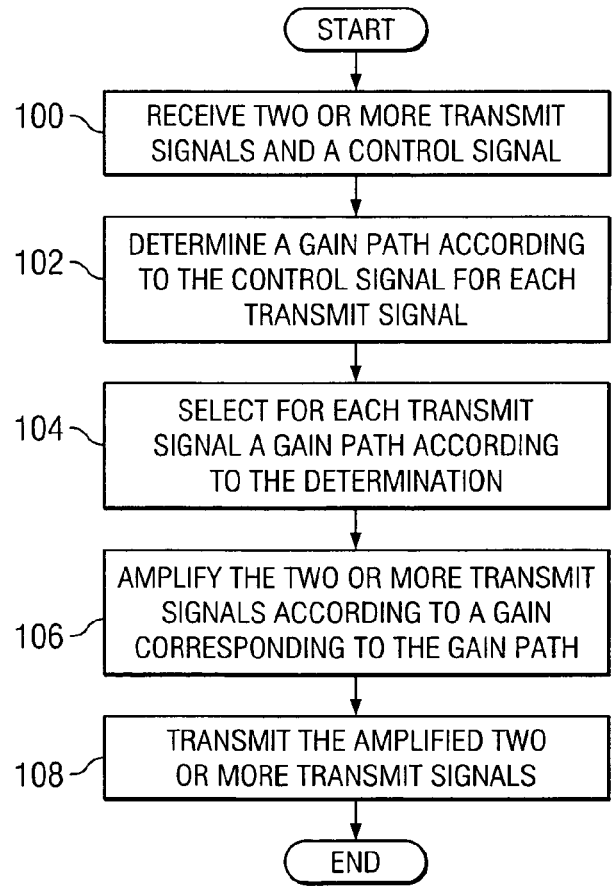
FIG. 5 is a flowchart illustrating a method for amplifying diversity signals in accordance with the present invention.

FIG. 5 is a flowchart illustrating a method for amplifying diversity signals. The method begins at step 100, where power amplifier module 18 receives two or more transmit signals and a control signal. According to one embodiment, power amplifier module 18 may receive adjusted signals 16a and 16b and an external control signal 46. According to another embodiment, power amplifier module 18 may be equipped with an internal controller 42 that may generate an internal control signal 46 and other control signals.

At step 102, power amplifier module 18 determines a gain path for each channel according to the control signal 46. According to one embodiment, power amplifier module 18 receives control signal 46 to determine which gain path to select. For example, control signal 46 may comprise instructions for determining which of the two gain paths available comprises the high gain path. Power module 18, however, may determine which gain path to select in any other suitable manner. For example, a gain path may be selected based on a control code or other suitable control signals. According to one embodiment, the determination at step 102 may also include determining the appropriate bias point, appropriate control voltages, or any other signal needed at power module 18.

Power module 18 selects a gain path for each channel according to the determination, at step 104. As was described with reference to FIGS. 3A and 3B, switches 32a and 32b select a gain path according to the control signal 46. For example, control signal 46 may direct switches 32a and 32b to select the gain path that yields a high gain by effectuating a selection of first switch position 50a and 50b. Once a gain path is selected, switches 32a and 32b forward adjusted signals 16a and 16b to the corresponding selected gain path.

At step 106, power module 18 amplifies the two or more transmit signals according to a gain corresponding to the gain path. According to one embodiment, if the two or more transmit signals are forwarded to the high gain path, power amplifier module 18 amplifies the transmit signals according to a high gain with a maximum output in the range between approximately 23 dB and 31 dB. If the two or more transmit signals are forwarded to the low gain path, power amplifier module amplifies the transmit signals according to a low gain with a maximum output in the range of approximately between 5 dB and 15 dB.

Antennas 25 transmit the amplified two or more transmit signals at step 108. Power amplifier module 18 may forward amplified signals 19 to antennas 25 to generate diversity signals 26. After transmitting diversity signals 26, the method terminates.

The method may include more, fewer, or different steps. For example, a step may be added where power amplifier module 18 passes amplified signals 19 to loads 22. As another example, amplified signals 19 may be processed before transmitting by antennas 25 by adding a delay to one or both of the amplified signals 19. Additionally, the steps of the method may be performed in any suitable order and may be repeated. For example, determining a gain path according to the control signal at step 102 may be performed substantially simultaneously with selecting a gain path according to the determination at step 104. As another example, the method may be repeated such as when control signals change and/or are updated.

Certain embodiments of the invention may provide one or more technical advantages. A technical advantage of one embodiment may be that using a power amplifier for amplifying a transmit signal at each channel of a diversity antenna system may result in higher gains of the transmitted signal, which may improve signal reception at a base station. Another technical advantage of an embodiment may be that the power amplifiers of the diversity antenna system may operate at half-power compared to amplifiers used with a non-diversity antenna system, which may result in maintaining low power consumption while increasing the range of operation of the mobile device. Yet another technical advantage may be that operating at half-power may yield a lower total output power, lower cost, and reduce the total average current consumption. Yet another technical advantage of an embodiment may be that including a vector modulator and the power amplifiers at a common substrate may reduce size and cost of the mobile device.

Although an embodiment of the invention and its advantages are described in detail, a person skilled in the art could make various alterations, additions, and omissions without departing from the spirit and scope of the present invention as defined by the appended claims.

What is claimed is:

1. A method for amplifying diversity transmit signals, comprising:
   receiving a transmit signal at a vector modulator, the vector modulator operable to process the transmit signal to yield a plurality of diversity transmit signals by:
      splitting the transmit signal to yield at least two transmit signals;
      adjusting a phase of at least one of the at least two transmit signals;
      adjusting the amplitude of at least one of the at least two transmit signals; and
      generating the plurality of diversity transmit signals according to the adjusted transmit signals;
   amplifying each of the plurality of diversity transmit signals according to a gain using at least one power amplifier; and
   transmitting the plurality of amplified diversity transmit signals at a plurality of antennas.

2. The method of claim 1, further comprising passing each of the plurality of amplified diversity transmit signals through one or more loads, each load having a load impedance matching an antenna impedance corresponding to an antenna of the plurality of antennas.

3. The method of claim 1, wherein the vector modulator and the at least one power amplifier are located at a common substrate.

4. A method for amplifying diversity transmit signals, comprising:
   receiving two or more transmit signals and a control signal, the control signal comprising a gain path selection;
   selecting for each transmit signal at least one gain path from a plurality of gain paths according to the gain path selection of the control signal, each gain path of the plurality of gain paths comprising one or more amplifiers operable to yield at least one gain of a plurality of gains, a first gain path of the plurality of gain paths comprising one or more first amplifiers operable to yield a first gain of the plurality of gains, a second gain path of the plurality of gain paths comprising one or more second amplifiers operable to yield a second gain of the plurality of gains, the second gain different from the first gain;
   amplifying the two or more transmit signals according to the at least one gain of the plurality of gains; and
   transmitting the two or more amplified transmit signals using a plurality of antennas.

5. The method of claim 4, further comprising passing each of the two or more amplified diversity transmit signals through one or more loads, each load having a load impedance matching an antenna impedance corresponding to an antenna of the plurality of antennas.

6. The method of claim 4, wherein the control signal comprises an internal control signal.

7. The method of claim 4, wherein the control signal comprises an external control signal.

8. The method of claim 4, wherein:
   the first gain comprises a gain in a range of 5 dB to 15 dB.

9. The method of claim 4, wherein:
   the second gain comprises a gain in a range of 23 dB to 31 dB.

10. The method of claim 4, wherein:
    the second gain having 25 dB, the first gain having 12 dB.

11. The method of claim 4, wherein selecting at least one gain path for each transmit signal from a plurality of gain paths according to the gain path selection of the control signal further comprises:
    selecting the first gain path for a first transmit signal according to the control signal; and
    selecting the second gain path for a second transmit signal according to the control signal.

12. The method of claim 11, wherein the selection of the first gain path is performed substantially simultaneously with the selection of the second gain path.

13. A method for amplifying diversity transmit signals, comprising:
    receiving two or more transmit signals and a control signal, the control signal comprising a gain path selection;
    selecting for each transmit signal at least one gain path from a plurality of gain paths according to the gain path selection of the control signal, each gain path of the plurality of gain paths associated with at least one gain of a plurality of gains, wherein:
       each gain path comprises one or more amplification stages of a plurality of amplification stages, the one or more amplification stages operable to yield the associated gain;
       the plurality of gain paths comprises a first gain path and a second gain path;
       the plurality of amplification stages comprises a first plurality of amplification stages and a second plurality of amplification stages;
       the first gain path is associated with the first plurality of amplification stages and the second gain path is associated with the second plurality of amplification stages; and
       the first plurality of amplification stages is substantially different from the second plurality of amplification stages;
    amplifying the two or more transmit signals according to the at least one gain of the plurality of gains; and
    transmitting the two or more amplified transmit signals using a plurality of antennas.

14. A system for amplifying diversity transmit signals, comprising:
    a vector modulator operable to:
       receive a transmit signal; and
       process the transmit signal to yield a plurality of diversity transmit signals by:
          splitting the transmit signal to yield at least two transmit signals;
          adjusting a phase of at least one of the at least two transmit signals;
          adjusting the amplitude of at least one of the at least two transmit signals; and
          generating the plurality of diversity transmit signals according to the adjusted transmit signals;
    at least one power amplifier coupled to the vector modulator and operable to amplify each of the plurality of diversity transmit signals according to a gain; and a plurality of antennas for transmitting the plurality of amplified diversity transmit signals.

15. The system of claim 14, further comprising one or more loads for passing through each of the plurality of amplified diversity transmit signals, each load having a load impedance matching an antenna impedance corresponding to an antenna of the plurality of antennas.

16. The system of claim 14, wherein the vector modulator and the at least one power amplifier are located at a common substrate.

17. The system of claim 15, wherein the vector modulator, the at least one power amplifier, and the one or more loads are located at a common substrate.

18. A system for amplifying diversity transmit signals, comprising:
  a power amplifier module operable to:
    receive two or more transmit signals and a control signal, the control signal comprising a gain path selection;
    select for each transmit signal at least one gain path from a plurality of gain paths according to the gain path selection of the control signal, each gain path of the plurality of gain paths comprising one or more amplifiers operable to yield at least one gain of a plurality of gains, a first gain path of the plurality of gain paths comprising one or more first amplifiers operable to yield a first gain of the plurality of gains, a second gain path of the plurality of gain paths comprising one or more second amplifiers operable to yield a second gain of the plurality of gains, the second gain different from the first gain; and
    amplify the two or more transmit signals according to the at least one gain of the plurality of gains; and
  a plurality of antennas for transmitting the two or more amplified transmit signals.

19. The system of claim 18, further comprising one or more loads for passing through each of the two or more amplified diversity transmit signal, each load having a load impedance matching an antenna impedance corresponding to an antenna of the plurality of antennas.

20. The system of claim 18, wherein the control signal comprises an internal control signal.

21. The system of claim 18, wherein the control signal comprises an external control signal.

22. The system of claim 18, wherein:
  the first gain comprises a gain in a range of 5 dB to 15 dB.

23. The system of claim 18, wherein:
  the second gain comprises a gain in a range of 23 dB to 31 dB.

24. The system of claim 18, wherein:
  the second gain having 25 dB, the first gain having 12 dB.

25. The system of claim 18, the power amplifier further comprising a first switch and a second switch, the first switch operable to select the first gain path for a first transmit signal according to the control signal, the second switch operable to select the second gain path for a second transmit signal according to the control signal.

26. The system of claim 25, wherein the first switch and the second switch select the first gain path and second gain path substantially simultaneously.

27. A system for amplifying diversity transmit signals, comprising:
  a power amplifier module operable to:
    receive two or more transmit signals and a control signal, the control signal comprising a gain path selection;
    select for each transmit signal at least one gain path from a plurality of gain paths according to the gain path selection of the control signal, each gain path of the plurality of gain paths associated with at least one gain of a plurality of gains, wherein:
      each gain path comprises one or more amplification stages of a plurality of amplification stages, the one or more amplification stages operable to yield the associated gain;
      the plurality of gain paths comprises a first gain path and a second gain path;
      the plurality of amplification stages comprises a first plurality of amplification stages and a second plurality of amplification stages;
      the first gain path is associated with the first plurality of amplification stages and the second gain path is associated with the second plurality of amplification stages; and
      the first plurality of amplification stages is substantially different from the second plurality of amplification stages; and
    amplify the two or more transmit signals according to the at least one gain of the plurality of gains; and
  a plurality of antennas for transmitting the two or more amplified transmit signals.

28. A system for amplifying diversity transmit signals, comprising:
  means for receiving a transmit signal at a vector modulator, the vector modulator operable to process the transmit signal to yield a plurality of diversity transmit signals by:
    splitting the transmit signal to yield at least two transmit signals;
    adjusting a phase of at least one of the at least two transmit signals;
    adjusting the amplitude of at least one of the at least two transmit signals; and
    generating the plurality of diversity transmit signals according to the adjusted transmit signals;
  means for amplifying each of the plurality of diversity transmit signals according to a gain using at least one power amplifier; and
  means for transmitting the plurality of amplified diversity transmit signals at a plurality of antennas.

29. A system for amplifying diversity transmit signals, comprising:
  means for receiving two or more transmit signals and a control signal, the control signal comprising a gain path selection;
  means for selecting at least one gain path from a plurality of gain paths according to the gain path selection of the control signal, each gain path of the plurality of gain paths comprising one or more amplifiers operable to yield at least one gain of a plurality of gains, a first gain path of the plurality of gain paths comprising one or more first amplifiers operable to yield a first gain of the plurality of gains, a second gain path of the plurality of gain paths comprising one or more second amplifiers operable to yield a second gain of the plurality of gains, the second gain different from the first gain;
  means for amplifying the two or more transmit signals according to the at least one gain of the plurality of gains; and
  means for transmitting the two or more amplified transmit signals using a plurality of antennas.

30. A system for amplifying diversity transmit signals, comprising:

a power amplifier module operable to:
  receive two or more transmit signals and a control signal, the control signal comprising a gain path selection and one of a received internal control signal or an external control signal;
  select for each transmit signal at least one gain path from a plurality of gain paths according to the gain path selection of the control signal, each gain path of the plurality of gain paths associated with at least one gain of a plurality of gains and comprising one or more power amplifiers, the one or more power amplifiers collectively yielding the at least one gain of the plurality of gains; and
  amplify the two or more transmit signals according to the at least one gain of the plurality of gains, the at least one gain comprising a high gain and a low gain;
a plurality of antennas for transmitting the two or more amplified transmit signals; and
one or more loads for passing through each of the two or more amplified diversity transmit signal, each load having a load impedance matching an antenna impedance corresponding to an antenna of the plurality of antennas.

* * * * *